Sept. 11, 1956     G. D. BRICKER     2,762,050
EYE SHADE FOR USE ON SPECTACLES
Filed July 9, 1953
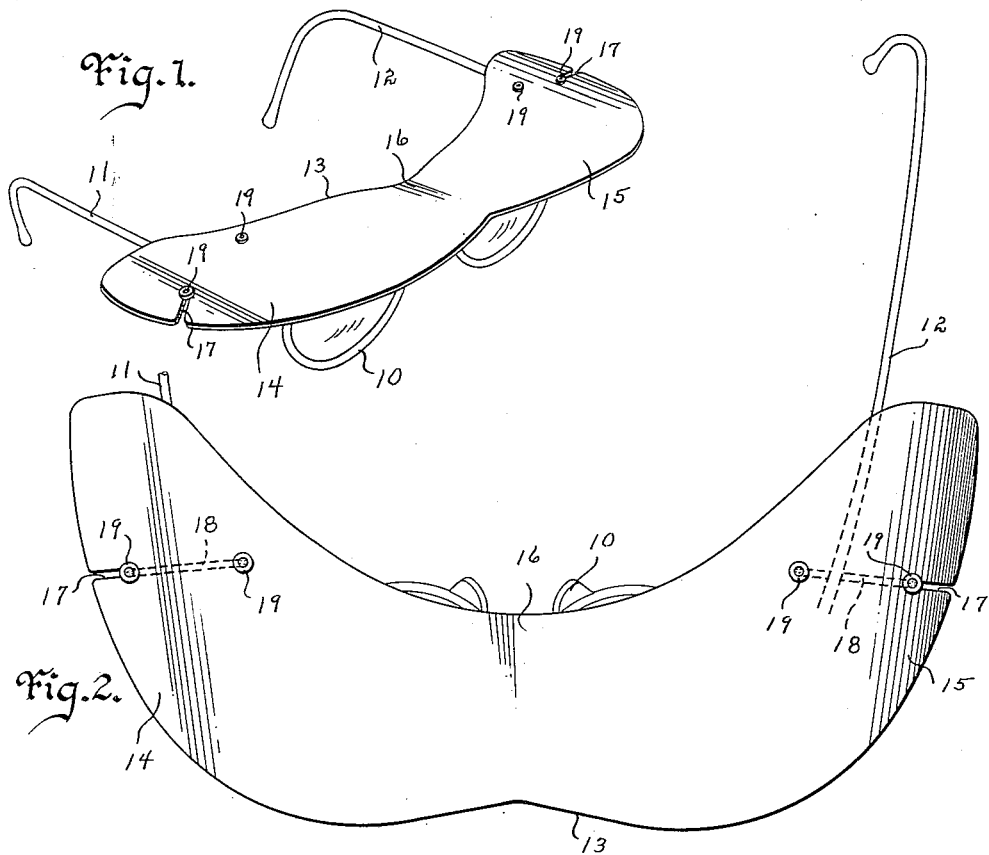
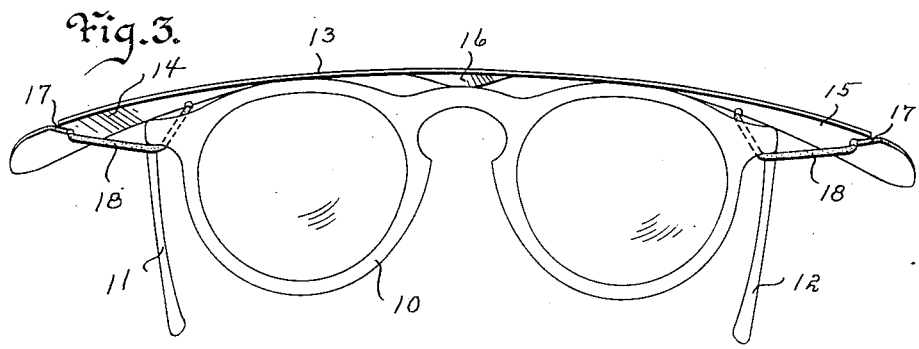
Witness
Edward G. Seeley
Inventor
George Dale Bricker
by Talbert Dick & Adler
Attorneys

# United States Patent Office 2,762,050
Patented Sept. 11, 1956

2,762,050

EYE SHADE FOR USE ON SPECTACLES

George Dale Bricker, Des Moines, Iowa

Application July 9, 1953, Serial No. 366,903

6 Claims. (Cl. 2—13)

This invention relates to eye shades and particularly to shades that may be attached to the spectacles of the user.

The use of eye shades on spectacles is, however, not new. Such shades are sometimes a permanent part of the spectacles. The chief objections to these permanent installations are that the unit is most bulky and cumbersome when not in actual use, and there is no selection as to the use of the spectacles with or without the shades. In those products where the shade is detachable, much advantage is obtained. However, most such shades are objectionable in that they are not easily installed or removed, have objectionable metal parts, will not fit onto all types of spectacles, and are quite costly.

Therefore, the principal object of my invention is to provide a simple shade that is capable of being quickly and easily attached or removed from a spectacle.

A further object of this invention is to provide a spectacle shade that is effective and safe in use.

Still further objects of my invention are to provide an eye shade that is economical in manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my eye shade installed on a pair of spectacles,

Fig. 2 is an enlarged top plan view of my eye shade on a pair of spectacles, and Fig. 3 is a front view of a pair of spectacles with my shade thereon, and more fully illustrating its construction.

In these drawings I have used the numeral 10 to designate a pair of spectacles having the usual hinged bows 11 and 12. It is to such a pair of spectacles that I install my eye shade and which I will now describe in detail.

The numeral 13 generally designates the eye shade proper. This shade which is to rest in substantially a horizontal plane over the frame of the spectacles and above and forward of the eyes of the user may be of almost any suitable shape. In the drawings I show it having two wing portions 14 and 15 extending over and to each side of the two lens portions respectively of the spectacles. The extreme center rear portion may be depressed at 16. The front edge and sides may be curved as desired. The rear edge, however, should be in a concave path to conform with the curvature of the forehead of the user. This shade may be made of any suitable sheet material such as card board, sheet plastic, light metal or like.

My invention, however, is in the new and novel means for detachably securing the shade to the spectacles. In the side portion of each wing portion, I form one small hole and one slit communicating with the adjacent edge of the shield as shown in Fig. 2. I have used the numeral 17 to designate these two slit openings. The hole adjacent each slit is spaced substantially from its slit and thus is located further from the side edge of the shield than its adjacent slit. The numeral 18 designates a length of flexible elastic strand or cord threaded through each hole at time of manufacture. A button, bead, head or like 19 secured on each end of each of the two cords 18. These members 19 have a greater diameter than the holes and also have a diameter width greater than the width of the slits 17.

To install my shade, it is merely necessary to place the shade over the spectacles and then draw each of the cords downwardly and under bows respectively, after which the free end portions of the cords are slid into the slit openings in the side edge portions of the shade. By releasing the flexible resilient cords, the heads 19 on the outer free ends of the cords will engage the top of the shade, thereby securing the shade to the spectacles. Obviously, the elastic cords will contract or expand to compensate for different sizes of spectacles and different width bows. Furthermore, the shade will be yieldingly held to the spectacles, thereby eliminating rattle or noise. With the cords engaging the forward end portions of the bows, the bows may be folded in the usual manner, if the user wishes to dispense with the spectacles, but does not wish to remove the shade. When attached, as shown in Fig. 1, the cord end beads or like 19 will rest above the shade giving a very finished and attractive appearance.

To remove the shade, it is merely necessary to grasp the beads 19, pull upwardly against the spring action of the cords and slide the same outwardly from the slits 17, at which time the shade will fall from the spectacles.

When removed, the shade and all its fastening means will lay flat, making for easy carrying as well as shipment.

The placement on or removal from a pair of spectacles is so easily done that the same may be accomplished without removal of the spectacles from the head of the user. Inasmuch as the cords are elastic, there is considerable resilient movement possible between the shade and spectacles, thereby making for safety for the user.

The shade proper may be translucent, opaque, or non-transparent, and of any desired color.

Some changes may be made in the construction and arrangement of my eye shade for use on spectacles without departing from the real spirit and purpose of my invention, and it is my intention to cover by my claims, any modified forms of structure or use of mechanical equivalents which may be reasonably included within their scope.

I claim:

1. In an eye shade adapted to be detachably secured to a pair of spectacles having two bows, a shade portion having two side wing portions; said shade portion having its rear center edge concave to conform to the head of the user and the forward side edge portion of its two wing portions each extending laterally and rearwardly in a curved path; each of said wing portions having a hole and notch, a flexible resilient elongated member on each of said wing portions having its inner end secured to said hole therein and its outer length portion capable of detachably extending into said notch, and a member on the outer end of said resilient member having a dimension greater than that of the width of said notch.

2. In an eye shade adapted to be detachably secured to a pair of spectacles having two bows, a shade portion having two side wing portions; said shade portion having its rear center edge concave to conform to the head of the user and the forward side edge portion of its two wing portions each extending laterally and rearwardly in a curved path; each of said wing portions having a hole and notch, a flexible resilient elongated member on each of said wing portions having its inner end secured to said hole therein and its outer length portion capable of detachably extending into said notch, and a member on the outer end of said resilient member having a dimension greater than that of the width of said notch; said shade portion having its rear center portion depressed downwardly.

3. In an eye shade adapted to be detachably secured to a pair of spectacles having two bows, a shade portion having two side wing portions; said shade portion having its rear center edge concave to conform to the head of the user and the forward side edge portion of its two wing portions each extending laterally and rearwardly in a curved path; each of said wing portions having a hole and notch, a flexible resilient elongated member on each of said wing portions having its inner end secured to said hole therein and its outer length portion capable of detachably extending into said notch, and a member on the outer end of said resilient member having a dimension greater than that of the width of said notch; said wing portions having their outer ends terminating in a horizontal plane above the plane of the horizontal vision of the user.

4. In an eye shade adapted to be detachably secured to a pair of spectacles having two bows, a shade portion having two side wing portions; said shade portion having its rear center edge concave to conform to the head of the user; each of said wing portions having a hole and notch, a flexible resilient elongated member on each of said wing portions having its inner end secured to said hole therein and its outer length portion capable of detachably extending into the adjacent notch, and a member on the outer end of each of said resilient members having a dimension greater than that of the width of said notch into which its resilient member extends.

5. In an eye shade adapted to be detachably secured to a pair of spectacles having two bows, a shade portion having two side wing portions; each of said wing portions having a notch, a flexible resilient elongated member on each of said wing portions having its inner end secured to its respective wing portion and its outer length portion capable of detachably extending into the adjacent notch, and a member on the outer end of each of said resilient members having a dimension greater than that of the width of said notch into which its resilient member extends.

6. An eye shade, adapted to be detachably secured to a pair of spectacles, said spectacles having a frame and two hinged bows thereon, said eye shade including an elongated flat member adapted to extend across the said bows and shade the eyes, a flexible, resilient, elongated holding member on each end portion of the shade, each of said members having one end secured to the shade and another end secured to the shade in longitudinally spaced relation to the first end at its point of securing to the shade, said members extending on the underside of said shade at opposite end portions thereof whereby said bows may respectively be received between said flexible members and the undersurface of the shade and said members may slide longitudinally on said bows respectively for adjustably positioning said eye shade on said spectacles.

References Cited in the file of this patent

UNITED STATES PATENTS

| 542,015 | Goodman | July 2, 1895 |
| 2,541,242 | Grove | Feb. 13, 1951 |

FOREIGN PATENTS

| 587,427 | Germany | Nov. 4, 1933 |
| 854,233 | France | Jan. 4, 1940 |